United States Patent
Danilak (10) Patent No.: US 7,117,421 B1
(45) Date of Patent: Oct. 3, 2006

(54) TRANSPARENT ERROR CORRECTION CODE MEMORY SYSTEM AND METHOD

(75) Inventor: Radoslav Danilak, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 10/159,460

(22) Filed: May 31, 2002

(51) Int. Cl.
   *G11C 29/00* (2006.01)
   *G11C 7/00* (2006.01)

(52) U.S. Cl. .................. 714/763; 365/201

(58) Field of Classification Search ............... 714/763, 714/768, 769, 752; 365/201
   See application file for complete search history.

(56) References Cited

U.S. PATENT DOCUMENTS

| | | | |
|---|---|---|---|
| 5,172,379 A * | 12/1992 | Burrer et al. ............... | 714/767 |
| 5,233,616 A * | 8/1993 | Callander ................... | 714/758 |
| 5,313,464 A | 5/1994 | Reiff .......................... | 371/2.1 |
| 5,452,429 A * | 9/1995 | Fuoco et al. .................. | 714/6 |
| 5,553,264 A | 9/1996 | Ozveren et al. ............. | 395/462 |
| 5,666,371 A | 9/1997 | Purdham .................. | 371/40.11 |
| 5,987,627 A | 11/1999 | Rawlings, III ............... | 714/48 |
| 6,049,476 A * | 4/2000 | Laudon et al. ................ | 365/52 |
| 6,076,182 A * | 6/2000 | Jeddeloh ..................... | 714/763 |
| 6,216,245 B1 * | 4/2001 | Noda ........................ | 714/755 |
| 6,279,072 B1 * | 8/2001 | Williams et al. ............. | 711/105 |
| 6,457,155 B1 * | 9/2002 | Dell et al. ................... | 714/773 |
| 6,662,333 B1 * | 12/2003 | Zhang et al. ................ | 714/767 |
| 2002/0029315 A1 | 3/2002 | Williams et al. ............. | 711/105 |
| 2002/0029415 A1 | 3/2002 | Williams et al. ............. | 711/105 |

FOREIGN PATENT DOCUMENTS

| EP | 112645 A1 | 8/2001 |
|---|---|---|
| EP | 1122645 | 8/2001 |

* cited by examiner

*Primary Examiner*—Guy Lamarre
*Assistant Examiner*—Esaw Abraham
(74) *Attorney, Agent, or Firm*—Wagner, Murabito & Hao LLP (57) ABSTRACT

The present invention provides flexible and efficient memory configuration that is capable of economically addressing both resource consumption and ECC concerns. A memory system facilitates transparent ECC operations without dedicated ECC connections. A first dynamic random access memory structure stores data, wherein the data connections to the memory system are limited to the width of the first dynamic random access memory structure. A second dynamic random access memory structure dedicated to storing error correction code information, wherein the error correction code information is accessed via the data connections. In one exemplary implementation, the first memory structure and the second memory structure the data and ECC are included in the same memory bank. In an alternate implementation, the first memory structure and the second memory structure the data and ECC are included in the different memory banks and are accessed in parallel.

34 Claims, 6 Drawing Sheets

FIGURE 1

| CLOCK CYCLE | RETRIEVED INFORMATION | | | | | | | |
|---|---|---|---|---|---|---|---|---|
| 0 | D-00 | D-01 | D-02 | D-03 | D-04 | D-05 | D-06 | D-07 |
| 1 | D-08 | D-09 | D-10 | D-11 | D-12 | D-13 | D-14 | D-15 |
| 2 | D-16 | D-17 | D-18 | D-19 | D-20 | D-21 | D-22 | D-23 |
| 3 | D-24 | D-25 | D-26 | D-27 | D-28 | D-29 | D-30 | D-31 |
| 4 | ECC | ECC | ECC | ECC | ECC | | | |

FIGURE 2A

| CLOCK CYCLE | RETRIEVED INFORMATION | | | | | | | |
|---|---|---|---|---|---|---|---|---|
| 0 | D-00 | D-01 | D-02 | D-03 | D-04 | D-05 | D-06 | D-07 |
| 1 | ECC | D-08 | D-09 | D-10 | D-11 | D-12 | D-13 | D-14 |
| 2 | D-15 | ECC | D-16 | D-17 | D-18 | D-19 | D-20 | D-21 |
| 3 | D-22 | D-23 | ECC | D-24 | D-25 | D-26 | D-27 | D-28 |
| 4 | D-29 | D-30 | D-31 | ECC | | | | |

```
┌─────────────────────────────────────────────────┐
│ LOGICALLY PARTITIONING A MEMORY INTO A FIRST SECTION │
│              AND A SECOND SECTION.              │
│                       510                       │
└─────────────────────────────────────────────────┘
                        │
                        ▼
┌─────────────────────────────────────────────────┐
│  DATA AND ECC ARE WRITTEN TO THE MEMORY VIA DATA │
│ CONNECTION PINS THAT COMMUNICATE BOTH DATA AND ECC. │
│                       520                       │
└─────────────────────────────────────────────────┘
                        │
                        ▼
┌─────────────────────────────────────────────────┐
│   DATA AND ECC ARE READ FROM THE MEMORY VIA DATA │
│ CONNECTION PINS THAT COMMUNICATE BOTH DATA AND ECC. │
│                       530                       │
└─────────────────────────────────────────────────┘
                        │
                        ▼
┌─────────────────────────────────────────────────┐
│         PERFORMING ECC OPERATIONS ON THE DATA    │
│                       540                       │
└─────────────────────────────────────────────────┘
```

FIGURE 5

TRANSPARENT ERROR CORRECTION CODE MEMORY SYSTEM AND METHOD

FIELD OF THE INVENTION

The present invention relates to the field of electronic memory design. More particularly, the present invention relates to a system and method for providing transparent error correction code (ECC) memory capabilities without dedicated ECC pin connections.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of information stored on a memory media and manipulated by a processing device. The accuracy of the information stored in the memory often has a significant impact on the usefulness of the results. Providing greater accuracy typically requires memory components capable of supporting error correction activities. Traditional approaches to error correction usually require components to include additional dedicated connections or pins for error correcting information. These additional connection pins consume resources and increase the difficulty of manufacturing a memory component or chipset.

The information stored in a memory usually includes software programs comprising a series of instructions for manipulating data in the performance of useful tasks associated with a particular application. Generally, a certain level of accuracy in the information is required for the application to perform properly. The information is usually represented by bits comprising logical values (e.g., a string of ones and zeroes) stored in a memory. However, there is a possibility that the bit values are altered when the information is stored in memory. It is relatively common for at least some logical one values to be erroneous stored as a logical zero or vise versa. The impact that these erroneous inversions have typically depends upon the application which the information is utilized with.

Some applications do not require significant memory accuracy. For example, erroneous bits do not generally have a significant impact on graphics applications. Most graphics systems are directed to providing a visual display on a monitor. The visual display typically includes a very large number of pixels and a slight variation in a few of the pixels due to erroneous bits is not typically detected by the naked eye. Thus, the possibility that some of the pixel information may get distorted in memory does not have a perceptible impact on the final performance of the system.

Other applications however, often require a relatively high degree of information and memory reliability. If the data is sensitive, valuable, or utilized in a critical activity, a high degree of memory reliability is usually required. For example, applications that can impact public safety (e.g., applications used to design bridges, cars, planes, etc.) or are related to financial activities (e.g. banking, stock trading, etc.) usually require a high level of reliability. It is desirable to ensure that there is no erroneous changes in the information associated with these applications. Thus, the ability to detect erroneous information is very important in some applications.

Providing features that improve information reliability usually results in more resources being consumed when a memory component and/or chipset is manufactured. Providing connection pins dedicated for data communication and separate pins dedicated to communicating error correction information associated with the data increases the complexity of manufacturing operations. More complicated error correction schemes usually require a large number of dedicated pins to accommodate communication of the information. Although it is important to provide error correction capabilities, providing dedicated input and output (IO) pins for error correction code (ECC) operations takes up precious connections and expends valuable placement resources. Thus, a designer often has to expend significant chip resources for error correction operations or leave out the advantageous features.

Deciding whether to invest the additional resources for an error capable system or to opt for a normal memory system is usually very hard. It is difficult to predict the applications that will be utilized on a particular system with a great degree of certainty. Thus, for systems that typically do not engage in activities involving sensitive information, expensive connections dedicated for error correction operations are rarely utilized. However, if a user opts for a traditional memory that does not have dedicated error correction capabilities then they run the risk of unreliable memory storage when they do engage in sensitive activities. The dilemma of whether to provide an error correcting memory or a more economical memory increases fabrication problems for manufacturers also. As a practical matter, manufactures usually expend resources designing and manufacturing both types of memories and/or chipsets to respond to the respective conflicting market demands. Providing separate designs and manufacturing facilities is very expensive.

What is required is a flexible and efficient memory capable of addressing both pin resource consumption and error correction concerns.

SUMMARY

The present invention facilitates utilization of flexible and efficient memory configurations that are capable of addressing both connection pin resource consumption and error correction concerns. A present invention transparent error correction code (ECC) memory system facilitates ECC operations without dedicated ECC connections. A transparent ECC memory system utilizes at least some of the same connection pins to communicate both data and ECC to a memory. A user selects whether ECC capabilities are enabled or if memory accesses proceed in a normal fashion with out ECC capabilities. When the user enables ECC capabilities, then ECC operations are performed transparently by communicating the ECC information to and from memory via the same memory connections over which data is communicated. The present invention is readily adaptable to a variety of physical and logical configurations without the need for memory and/or chipset connection pins dedicated to communicating ECC information.

In one embodiment of the present invention, a memory is logically partitioned into a plurality of memory structures or sections. A first random access memory (RAM) structure stores data, wherein the data connections to the memory system are limited to the width of the first random access memory structure. A second random access memory structure is dedicated to storing error correction code information, wherein the error correction code information is accessed via the data connections. In an alternative embodiment, the data and ECC is interleaved and any overflow of data and ECC is stored in the second memory structure. For example, in a system that utilizes 32 byte bursts of data, 29 bytes of data and three bytes of ECC are written to and read from the same memory address that would be used if ECC were not in use. The overflow, is written to and read from a different address containing the other three data bytes and fourth ECC byte. The data and ECC are communicated to and from the memory structures via the same connection pins.

In another exemplary implementation of the present invention, two different memory banks are logically partitioned into structures dedicated to data and ECC. The data information stored in the first memory bank utilizes the ECC stored in the second memory bank for error checking and correction. The data stored in the second memory bank is associated with ECC stored in the first memory bank. Each memory bank utilizes the same connection pins to communicate data and ECC information that is stored in the memory bank. The data from one memory bank and ECC from the other memory bank are accessed in parallel. Thus, the same data connection pin communicates data and ECC but not during the same access. During any given access data is communicated to or from one memory bank and ECC is communicated to or from the other memory bank. Memory banks can be in separate integrated circuits, or, can be in the same integrated circuit.

DETAILED DESCRIPTION

Reference will now be made in detail to the preferred embodiments of the invention, a transparent error correction code (ECC) memory system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

A transparent ECC system and method of the present invention facilitates the implementation of ECC capabilities without dedicated ECC pins in a memory module and chipset. The same connection pins (e.g., 64 pins) are utilized to communicate both data and ECC rather than prior art with connection pins dedicated to data only (e.g., 64 pins) and additional connection pins (e.g., 8) dedicated to ECC. In one exemplary implementation of the present invention, an area of the memory space is dedicated for use in transparent data organizational approaches discussed below (e.g., dedicated to ECC information or dedicated to overflow information). The present invention is readily adaptable for use in systems with multiple physical memory configurations. In one embodiment, a single bank configuration comprising one physical memory (e.g., a dual in line memory module, DIMM) is utilized. In another embodiment, there is a multiple memory bank configuration comprising at least two banks, wherein data and its corresponding ECC information are stored in separate banks. In another embodiment, a multiple channel configuration comprises at least two physical memories (e.g., separate DIMMS) wherein each physical memory is accessible by a separate memory channel, wherein data and its corresponding ECC information are stored in physical memories that are connected to different channels.

Figure 1:
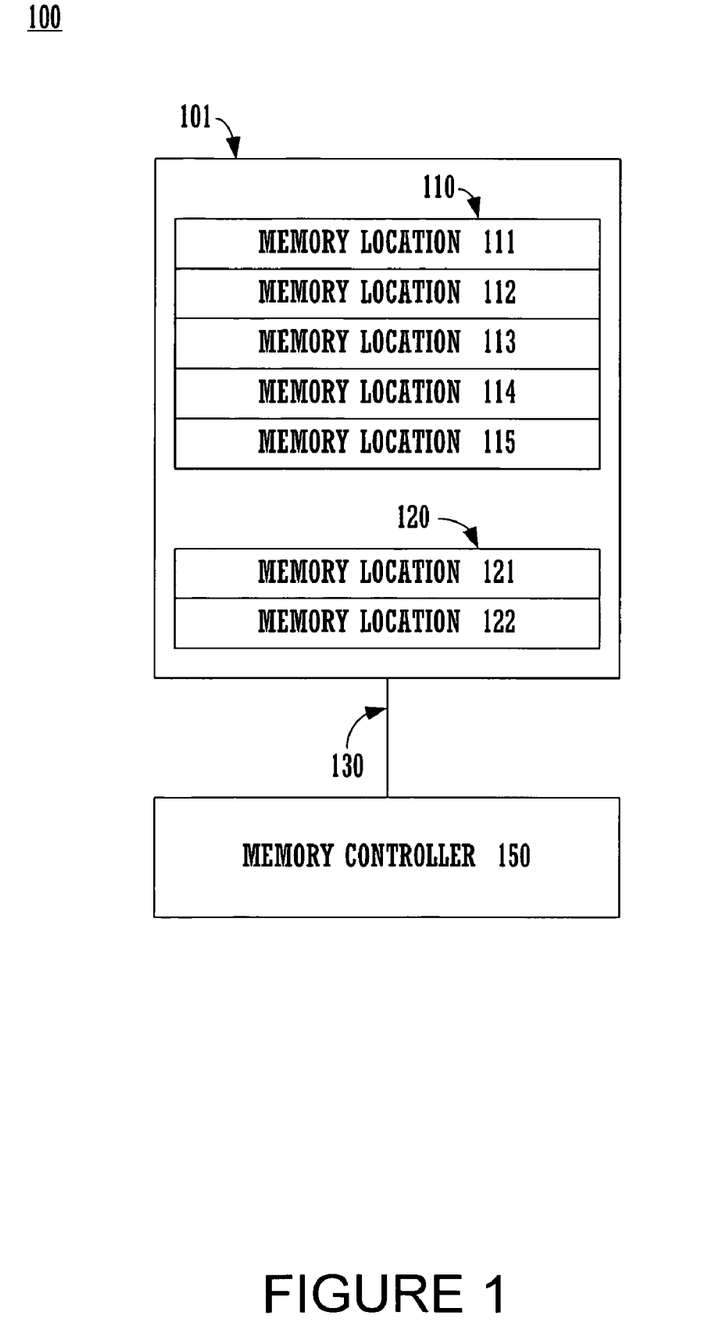
FIG. 1 is a block diagram of a transparent ECC memory system in accordance with one embodiment of the present invention.

FIG. 1 is a block diagram of transparent ECC memory system 100, one embodiment of the present invention. Transparent ECC memory system 100 comprises memory bank 101, memory communications channel 130, and memory controller 150. Memory bank 101 stores information, memory controller 150 controls the information storing and communications channel 130 provides a communication path between memory 101 and memory controller 150. The connections or pins at the end of communications bus 130 that couples memory 101 to memory controller 150 communicate both data and ECC information.

In one embodiment of the present invention, the memory locations within memory bank 101 are logically partitioned into a first memory structure 110 and a second memory structure 120. First memory structure 110 includes memory locations 111 through 115 and second memory structure 120 comprises memory locations 121 and 122. In one exemplary implementation of the present invention, memory bank 101 is a random access memory (e.g., a DIMM). Memory controller 150 controls accesses to memory bank 101 and the logical partitioning of memory bank 101. For example, memory controller 150 tracks which memory locations are included in first memory structure 110 and second memory structure 120 and directs memory read and write operations accordingly.

The present invention is readily adaptable to various memory configurations. In one embodiment, a 64 bit dual in line memory module is utilized. The same connection pins are utilized to communicate both data and ECC to and from the memory. For example, 64 bits of data are communicated via the 64 data pins of a DIMM and 8 bits of ECC associated with the data are communicated via 8 of those same data pins. Thus, the present invention permits data and ECC to be communicated to memory via 64 connection pins versus traditional systems that require 72 connection pins (64 connection pins dedicated to data and an additional 8 connection pins dedicated to ECC). There are at least two different organizational approaches for storing the information in the first memory structure and the second memory structure.

Figure 2A:
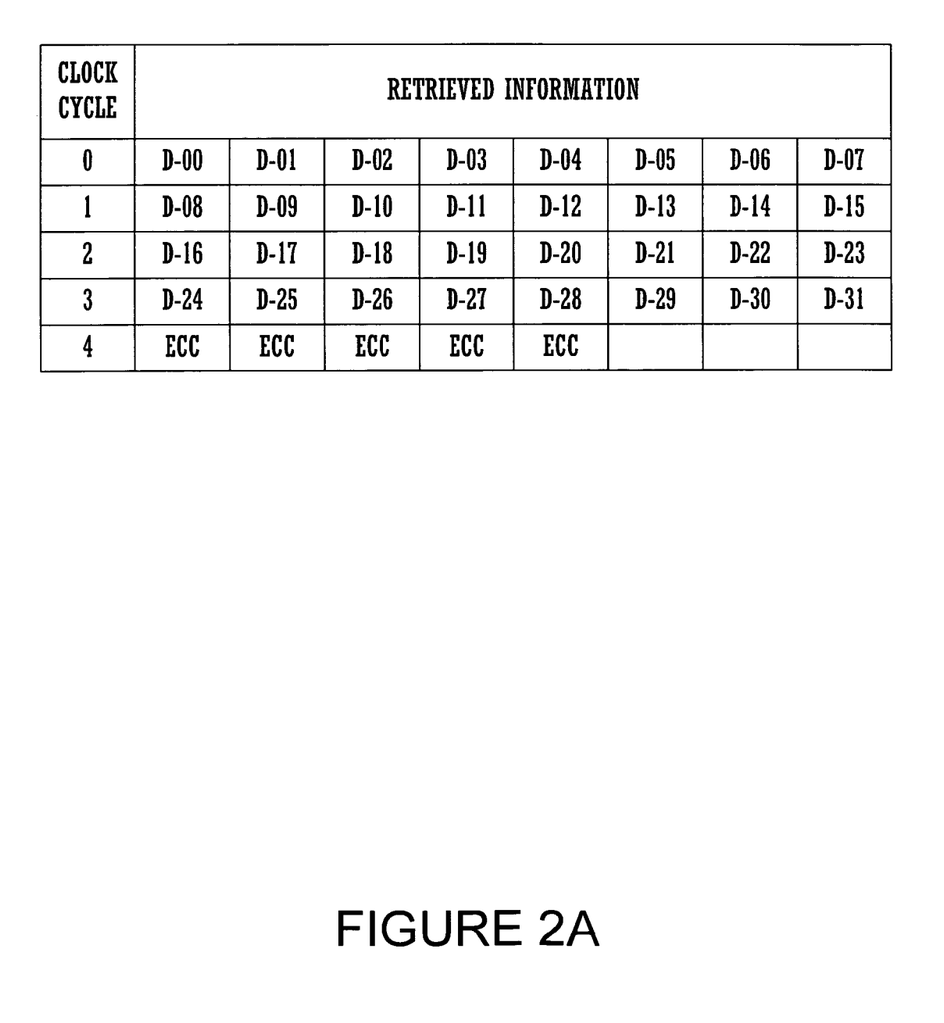
FIG. 2A is a table indicating the information retrieved during each memory access clock cycle from a memory in which data information is stored sequentially and ECC information is stored in logically partitioned memory.

The first data organizational approach utilizes the logically partitioned first memory structure 110 (e.g., a first RAM structure) for data storage and second memory structure 120 (e.g., a second RAM structure) for ECC storage. In one exemplary implementation, 32 bytes of data and 4 bytes of ECC information are retrieved from memory. Thirty two bytes of data are read from the first memory structure 110 and four bytes of ECC information are read from the second memory structure 120. The ECC information may be read first allowing error correction operations to begin on data as it is read from memory. FIG. 2A is a table showing an exemplary retrieval of information from memory in accordance with one embodiment of the present invention. Data is retrieved during four clock cycles (e.g., 0 through 3) and ECC information is retrieved during a fifth clock cycle (e.g., 4). In one embodiment of the present invention, the information is retrieved at a double data rate (DDR) in which information is communicated at both the rising and falling edges of the clock signal.

As an alternative to all the embodiments presented, some data may not have any corresponding ECC, thereby providing a memory system wherein some data is protected by ECC and data some is not. A further alternative provides dynamically adjusting the amount of data that has corresponding ECC, thereby increasing (or reducing) the effective amount of data storage when the amount of data that is protected by ECC is decreased (or increased).

The second organizational approach is to interleave the data and its corresponding ECC information in first memory structure 110 and dedicate second memory structure 120 to overflow information. For example, in a system that utilizes 32 byte bursts of data, 29 bytes of data and three bytes of ECC are written to and read from the same memory address that would be used if ECC were not in use (e.g., memory locations of first memory structure 110). The overflow is written to and read from a different address (e.g., a memory location of second memory structure 120) containing the other three data bytes and the fourth ECC byte.

Figure 2B:
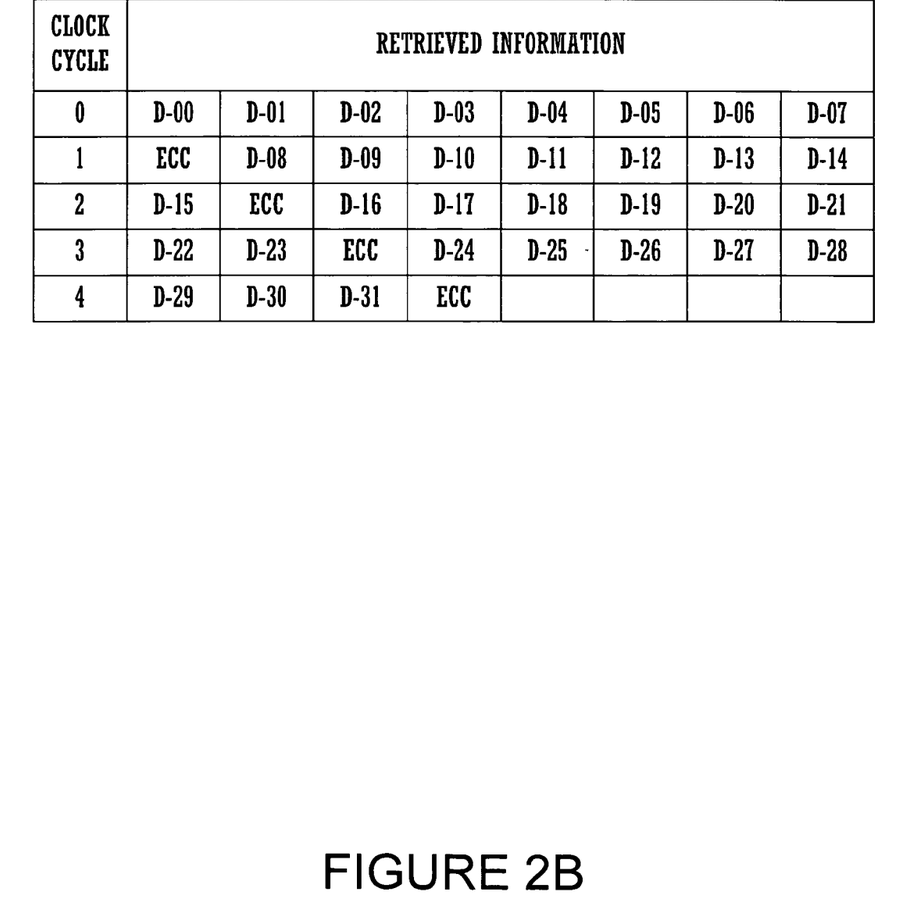
FIG. 2B is a table indicating the information retrieved during each memory access clock cycle from a memory in which data and ECC information are interleaved and overflow information is retrieved from logically partitioned memory.

FIG. 2B is a table indicating information retrieved during each memory access clock cycle, in accordance with one exemplary implementation of the present invention. During first four clock cycles interleaved data and ECC information are retrieved and during the fifth clock cycle overflow data and ECC information is retrieved. In this approach, error correction can begin with minimal latency because the ECC is interleaved with the data for write and read operations to and from the memory. This approach does not induce misalignment with word and page boundaries or require the performance of a calculation to form a new address since the overflow information is conveniently stored in predetermined locations within the second memory structure.

In an alternate embodiment of the present invention, a memory is not partitioned into separate structures or sections. In this organizational approach, data and its corresponding ECC information is interleaved in a sequential fashion throughout a single memory structure and memory address adjustments are made to compensate for the additional ECC information. For example, if there is one byte of ECC for every eight bytes of data, then data and ECC are packaged as 9 bytes that stay together, and every ninth byte in the DRAM is ECC, and the other 8/9 is data. Even though word and page boundaries within the DRAM may become misaligned, an address computation is performed to correct the alignment (e.g., the address is multiplied by 9/8). The advantage of this organizational approach is error correction can begin as soon as a package of nine bytes is received form the DRAM.

Figure 3:
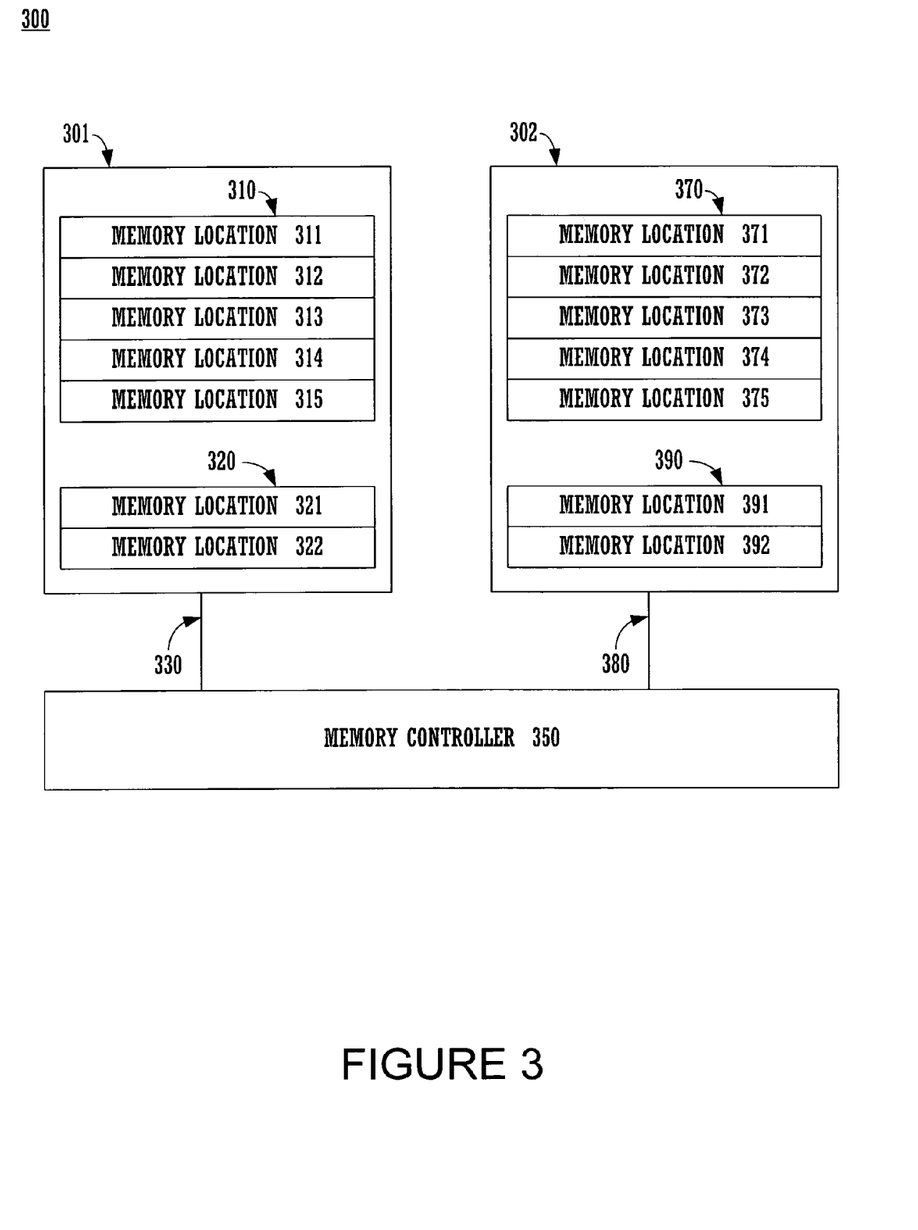
FIG. 3 is a block diagram of another embodiment of a present invention transparent ECC memory system in which multiple memory banks store ECC information for each other and permit parallel access to data in one memory bank and ECC information in another memory bank.

FIG. 3 is a block diagram of transparent ECC memory system 300, another embodiment of the present invention in which error correction operations may begin as soon as data is retrieved from memory. Transparent ECC memory system 300 is partitioned into a plurality of memory structures across multiple memory banks. Transparent ECC memory system 300 comprises memory bank 301, memory bank 302, memory communications channel 330, memory communications channel 380 and memory controller 350. Memory banks 301 and 302 store information including data and ECC. Memory controller 350 controls memory access operations (e.g., memory read and write operations). Communications channels 330 and 380 provide communication paths between memory controller 350 and memories 301 and 302 respectively. The connections or pins at the end of communications bus 330 and 380 that couple memory banks 301 and 302 to memory controller 350 communicate both data and error correction code information.

In one embodiment of the present invention, the memory banks are logically partitioned into sections for data and sections for ECC information. However, in the present dual memory bank embodiment, the ECC information stored in one structure or section is associated with the data stored in the other memory bank. For example, memory locations within memory bank 301 are logically partitioned into memory structure 310 and memory structure 320. Memory locations within memory bank 302 are logically partitioned into memory structure 370 and memory structure 390. First memory structure 310 includes memory locations 311 through 315 and second memory structure 320 comprises memory locations 321 and 322. Third memory structure 370 includes memory locations 371 through 375 and forth memory structure 390 comprises memory locations 391 and 392. Memory controller 350 controls accesses to and the logical partitioning of memory banks 301 and 302. For example, memory controller 350 tracks which memory locations are included in each memory structure 310, 320, 370 and 390 and directs memory read and write operations accordingly. For example, memory controller 350 writes data in first memory structure 310 and associated ECC in forth memory structure 390.

The structures or sections comprising the ECC information service the data in the other memory bank. Memory structure 320 stores ECC information utilized to check data stored in memory structure 370 and memory structure 390 stores ECC information utilized to check data stored in memory structure 310. Thus, when data is retrieved from memory structure 310, corresponding ECC information is retrieved from memory structure 390. Conversely, when data is retrieved from memory structure 370, corresponding ECC information is retrieved from memory structure 320. In one exemplary implementation of the present invention, the data and associated ECC information are retrieved from the corresponding memory structures in parallel. For example, memory controller 350 retrieves data from memory structure 310 via memory communications channel 330 and at the same time memory controller 350 retrieves corresponding ECC information from memory location 390 via memory communications channel 380.

As an option, ECC can be applied to only part of the data stored in the memory (e.g., a DRAM). For example, a memory may contain both program memory and frame buffer memory (or texture memory, etc.), in which case only the portion of DRAM used for program storage would utilize ECC.

Figure 4:
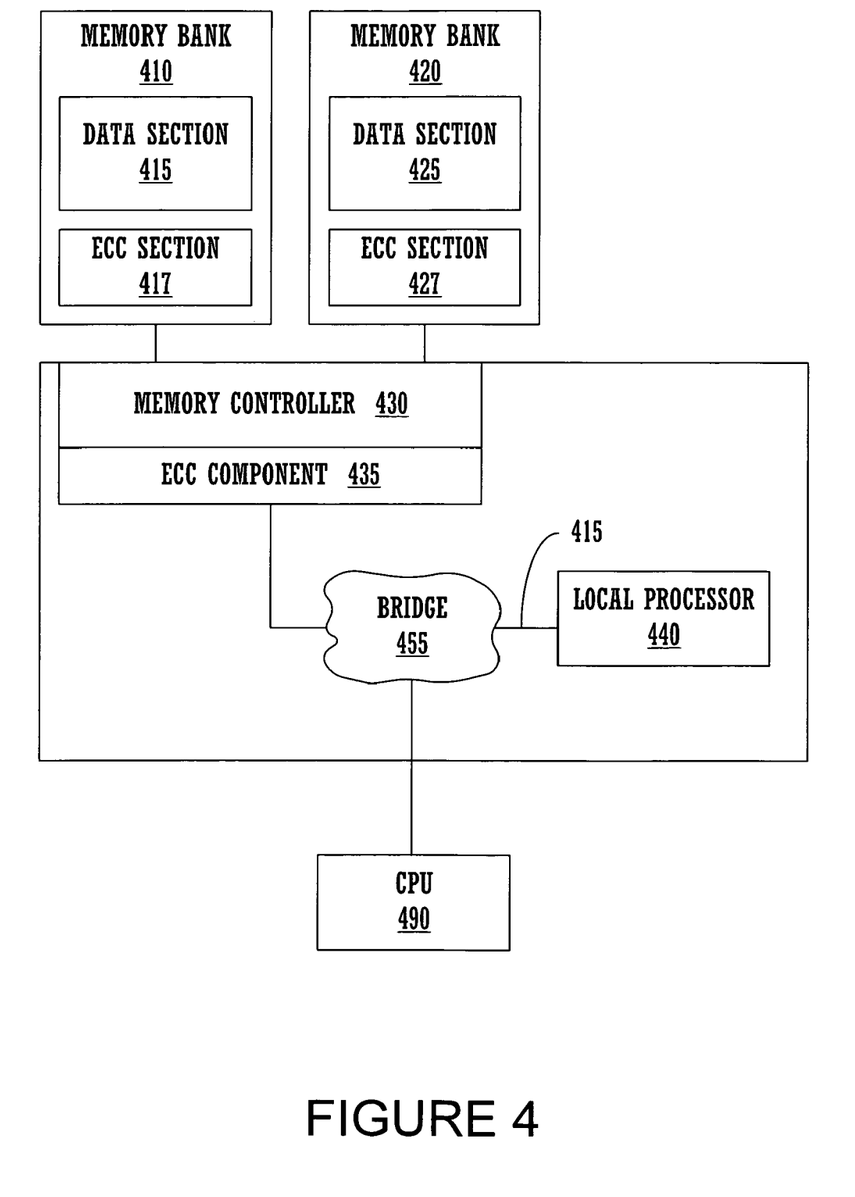
FIG. 4 is a block diagram of an exemplary computer system utilizing an embodiment of a present invention transparent ECC memory system.

FIG. 4 is a block diagram of exemplary system 400 utilizing a transparent ECC memory system in accordance with one embodiment of the present invention. System 400 comprises central processing unit (CPU) 490, bridge 455, local processor 440, internal bus 450, error correction component 435, memory controller 430, memory bank 410 and memory bank 420. Internal bus 450 is coupled to ECC component 435, local processor 440, and bridge 455 which is coupled to CPU 490. ECC component 435 is coupled to controller 430 which is coupled to memory bank 410 and memory bank 420. Memory bank 410 and 420 are logically partitioned into two sections or structures. The first sections are used to store data (e.g., data sections 415 and 425) and the second sections are used to store ECC information (e.g., ECC sections 417 and 427). The data and ECC information are communicated via the same memory connection pins.

An ECC selection component to initiate transparent ECC operations is provided in one embodiment of the present invention. The ECC selection component enables a user to choose if transparent ECC is enabled or not enabled. In one embodiment, if transparent ECC is enabled the memory is logically partitioned into a first structure (e.g., a section for data) and a second structure (e.g., a section for ECC). If transparent ECC is not enabled the memory is not logically partitioned to handle ECC operations. In an alternate embodiment, when transparent ECC is enabled the memory is not partitioned but ECC capabilities are provided by performing memory address adjustments to compensate for the additional ECC information. The ECC selection component may take a variety of forms including a hardwired switch or preferably a textual or graphical user interface.

Figure 5:
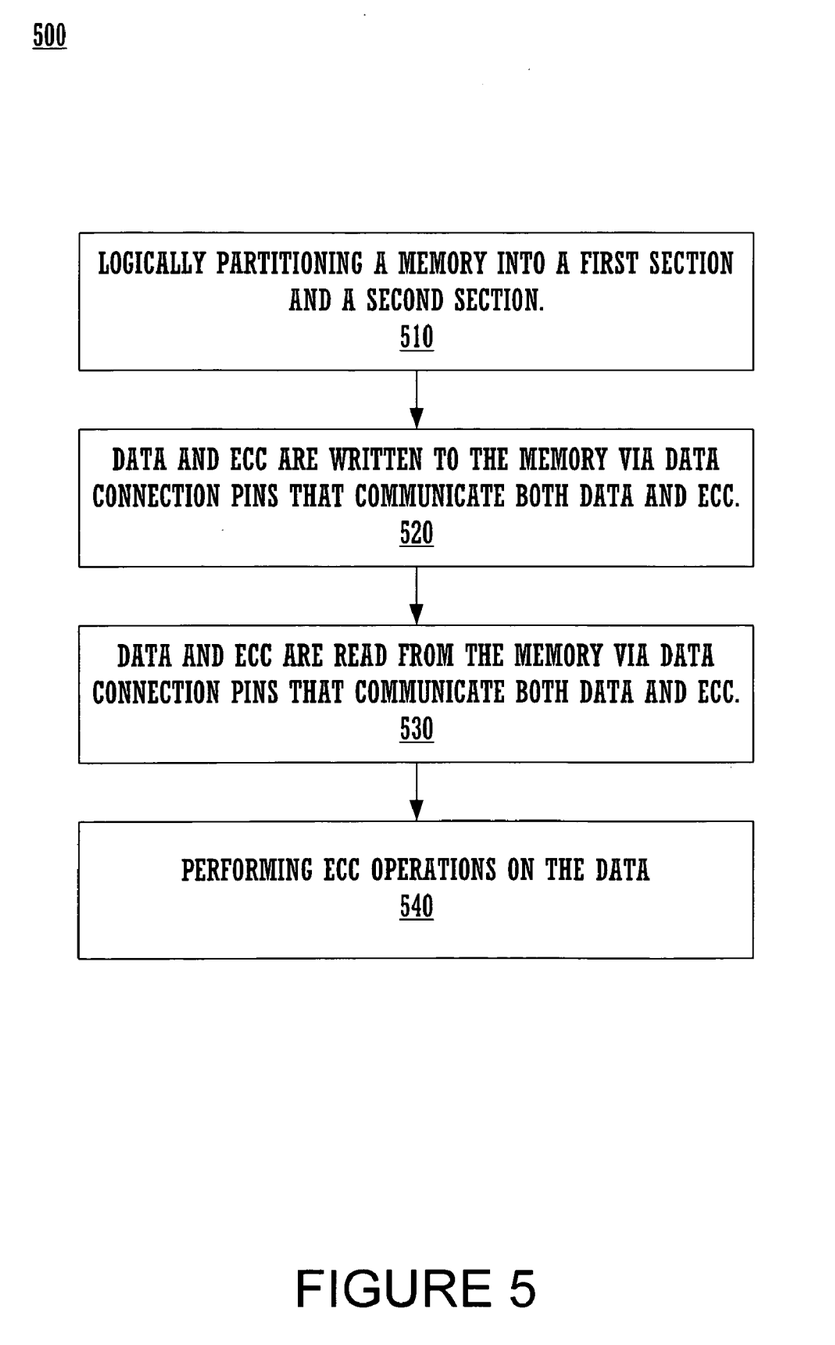
FIG. 5 is a flow chart of a transparent error correction code method in accordance with one embodiment of the present invention.

FIG. 5 is a flow chart of transparent error correction code method 500, one embodiment of the present invention. Transparent error correction code method 500 facilitates efficient correction of memory errors without the need for memory connection pins dedicated to error correction activities. Transparent error correction code method 500 is readily adaptable for implementation in a variety of memory system. For example, transparent error correction code method 500 may be implemented in dynamic random access memories (DRAM), static random access memories (SRAM) or flash memories configured as a dual in line memory module (DIMM) or a single in line memory module (SIMM). In one exemplary implementation of the present invention, transparent error correction code method 500 is implemented by a memory controller (e.g., 150, 350, etc.) included in a chipset.

In step 510, a memory is logically partitioned into a first section and a second section. In one embodiment, additional sections are logically partitioned in another memory bank. For example, the first section and second section are included in a first memory bank and a third section is included in a second memory bank. An indication to initiate the partitioning is provided in one exemplary implementation. For example, a graphical user interface is utilized by a user to select whether or not transparent error correction code method 500 is enabled.

Data and error correction code are written to the memory in step 520 via data connection pins that communicate both the data and the error correction code. In one exemplary implementation, data information is written to the first section and the error correction code is written to the second section. In an alternate implementation, data information is interleaved with the error correction code in the first section and overflow of the data information and the error correction code is written to the second section. In an embodiment comprising multiple memory chips, data is written to the first section of a first memory chip, error correction code not associated (e.g., not utilized to perform error checking on the data) with the data is written to a second section of the first memory bank, and error correction code associated (e.g., utilized to perform error checking on the data) with the data is written to a third section included in a second memory chip.

At step 530, the data and the error correction code are read from the memory data connection pins that communicate both the data and error correction code. The ECC information is read first in one example. In another embodiment comprising two memory banks, the data information in the first memory bank and the error correction code information in the second memory bank are accessed in parallel.

In step 540, error correction code operations are performed on the data. In one embodiment, the error correction code operations are based upon the error correction code information retrieved from the memory in step 530 via data connection pins. In an exemplary embodiment with multiple memory banks, the error correction code operations are based upon the error correction code information retrieved from a second memory bank via a different memory communications channel.

In another embodiment of a present transparent error correction code method, memory sections are not logically partitioned for error correction code storage. Data and error correction code information are stored in an interleaved fashion in sequential memory locations. The memory locations are accessed via connection pins utilized to communicate both data and error correction code information. An address misalignment correction is performed when retrieving the data and the error correction code information. In one embodiment, the memory locations are included in a single memory module and accessed via a single memory channel. For example, the memory locations are included in a random access memory fabricated in a dual in line memory module configuration.

Thus, the present invention provides flexible and efficient memory configuration that is capable of economically addressing both resource consumption and ECC concerns. Memory locations for data and ECC information are accessed through the same connection pins in a memory module. A user is able to conveniently indicate whether to activate transparent ECC capabilities or not. When transparent ECC capabilities are enabled sensitive information is afforded error correction protection. When the ECC capabilities are not enabled applications have access to the full memory space for data storage for data intensive activities (e.g., graphics applications). In either instance, the same memory model is capable of performing the memory functions and manufactures do not have to maintain design and manufacturing facilities for modules with different pin configurations (one for ECC and another for non ECC memories). The number of data connection pins included in the memory bank equals the data width of the memory and are capable of communicating both data and ECC. Therefore, economical memory systems with connection pins that communicate both data and ECC information (without the need for additional ECC dedicated pins) are available for flexible use with applications that require ECC and those that do not.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A memory system comprising:
   a first random access memory structure for storing data, wherein data connections to said memory system are limited to the data width of said first random access memory structure, the data width not including error correction code information; and
   a second random access memory structure dedicated to storing error correction code information, wherein said error correction code information is accessed via said data connections.

2. The memory system of claim 1 wherein said first random access memory structure and said second random access memory structure are included in the same memory bank.

3. The memory system of claim 2 wherein said first random access memory structure and said second random access memory structure are accessible via the same memory channel.

4. The memory system of claim 2 wherein said ECC information is accessed before said data information.

5. The memory system of claim 1 wherein said first random access memory structure and said second random access memory structure are included in different memory banks.

6. The memory system of claim 5 wherein said first random access memory structure for storing data is accessible via a first memory channel and said second random access memory structure dedicated to storing error correction code information is accessible via a second memory channel.

7. The memory system of claim 5 wherein said first random access memory structure and said second random access memory structure are accessed in parallel.

8. A memory system comprising:
   a first random access memory structure for storing interleaved data and error correction code information, wherein data connections to the memory system are limited to the width of said first random access memory structure; and
   a second random access memory structure dedicated to storing overflow information associated with error correction code determination, wherein said error correction code information is accessed via the said data connections.

9. The memory system of claim 8 wherein said first random access memory structure and said second random access memory structure are included in the same memory bank.

10. The memory system of claim 9 wherein said first random access memory structure and said second random access memory structure are accessible via the same memory channel.

11. The memory system of claim 8 wherein said overflow information includes both data and error correction code.

12. The memory system of claim 8 wherein said first random access memory structure and said second random access memory structure are included in different memory banks.

13. The memory system of claim 12 wherein said first random access memory structure for storing data is accessible via a first memory channel and said a second random access memory structure dedicated to storing error correction code information is accessible via a second memory channel.

14. The memory system of claim 13 wherein said first memory structure and said second memory structure are logically partitioned.

15. A transparent error correction code method comprising:
   partitioning a memory into a first section and a second section;
   writing data bits and a corresponding error correction code to said memory via data connection pins that communicate both said data and said error correction code, the number of data connection pins corresponding to the number of data bits and not including bits corresponding to the error correcting code; and
   reading said data and said error correction code from said memory via said data connection pins that communicate both said data and said error correction code.

16. The transparent error correction code method of claim 15 further comprising performing error correction code operations on said data based upon said error correction code information.

17. The transparent error correction code method of claim 15 wherein said data bits are written to said first section and said error correction code is written to said second section.

18. The transparent error correction code method of claim 15 wherein multiple groups of said data bits and said corresponding error correction code are interleaved within said first section and overflow of said multiple groups are stored in said second section.

19. The transparent error correction code method of claim 15 wherein said error correction code is not utilized to check errors in said data.

20. The transparent error correction code method of claim 19 further comprising partitioning additional sections in another memory bank.

21. The transparent error correction code method of claim 20 wherein said first section and said second section are included in a first memory bank and a third section is included in a second memory bank.

22. The transparent error correction code method of claim 20 further comprising:
   writing said data bits to said first section;
   writing an error correction code not associated with said data to said second section; and
   writing said error correction code corresponding to said data to said third section.

23. The transparent error correction code method of claim 22 wherein said data bits in said first section and said corresponding error correction code information in said third section are accessed in parallel.

24. The transparent error correction code method of claim 15 further comprising providing an indication to trigger said partitioning.

25. A transparent error correction code method comprising:
 storing data and error correction code information in an interleaved fashion in sequential memory locations;
 performing an address misalignment correction when retrieving said data and said error correction code information; and
 accessing said memory locations via connection pins utilized to communicate both said data and said error correction code information.

26. The transparent error correction code method of claim 25 wherein said memory locations are in a single memory bank and accessed via a single memory channel.

27. The transparent error correction code method of claim 25 wherein said memory locations are included in a random access memory.

28. The transparent error correction code method of claim 27 wherein said random access memory is fabricated in a dual in line memory module configuration.

29. A transparent error correction code method comprising:
 receiving a first set of data bits using a set of electrical connections to an integrated circuit, the number of bits in the first set being equal to the number of electrical connections;
 receiving error correction code information corresponding to the first set of data bits, the error correction code information received via the set of electrical connections; and
 receiving a second set of data bits using the set of electrical connections, the second set of data bits not having any corresponding error correction information.

30. A transparent error correction code method comprising:
 receiving a first set of data bits using a first set of electrical connections to an integrated circuit, the number of bits in the first set of data bits being equal to the number electrical connections in the first set of electrical connections;
 receiving a second set of data bits using a second set of electrical connections to the integrated circuit, the number of bits in the second set of data bits being equal to the number electrical connections in the second set of electrical connections;
 receiving first error correction code information corresponding to the first set of data bits, the first error correction code information received via the second set of electrical connections; and
 receiving second error correction code information corresponding to the second set of data bits, the second error correction code information received via the first set of electrical connections.

31. The transparent error correction code method of claim 30 comprising:
 receiving a third set of data bits using the first set of electrical connections, the third set of data bits not having any corresponding error correction code information.

32. A transparent error correction code method comprising:
 allocating memory for a first set of data words in a first physical memory;
 allocating memory for a second set of data words in a second physical memory;
 allocating memory for a first set of error correction codes in the second physical memory, the first set of error correction codes corresponding to the first set of data words;
 allocating memory for a second set of error correction codes in the first physical memory, the second set of error correction codes corresponding to the second set of data words;
 allocating memory for a third set of data words in the first physical memory, the third set of data words not having any corresponding error correction codes; and
 dynamically adjusting the size of the third set of data words.

33. The transparent error correction code method of claim 32 comprising:
 increasing the size of the third set of data words;
 decreasing the size of the first set of data words; and
 decreasing the size of the first set of error correcting codes.

34. The transparent error correction code method of claim 32 comprising:
 decreasing the size of the third set of data words;
 increasing the size of the first set of data words; and
 increasing the size of the first set of error correcting codes.

* * * * *